United States Patent [19]
da Fonseca-Wollheim

[11] 3,929,581
[45] Dec. 30, 1975

[54] QUANTITATIVE DETERMINATION OF BLOOD AMMONIA

[75] Inventor: Friedrich da Fonseca-Wollheim, Berlin, Germany

[73] Assignee: Boehringer Mannheim G.m.b.H., Mannheim-Waldhof, Germany

[22] Filed: May 17, 1974

[21] Appl. No.: 471,064

[30] Foreign Application Priority Data
June 7, 1973  Germany............................ 2329174

[52] U.S. Cl........................................... 195/103.5 R
[51] Int. Cl.$^2$............................................ C12K 1/04
[58] Field of Search........................ 195/103.5 R, 99

[56] References Cited
UNITED STATES PATENTS
3,527,674  9/1970  Deutch........................ 195/103.5 R OTHER PUBLICATIONS
A. Mondzac, "An Enzymatic Determination of Ammonia in Biological Fluids," J. Lab. Clin. Med. 66, pp. 526–531, 1965.
E. Schmidt "Glutamic Dehydrogenase," Methods of Enzymatic Analysis, H. V. Bergmeyer, Academic Press, N.Y. & London, pp. 752–756, 1965.

*Primary Examiner*—A. Louis Monacell
*Assistant Examiner*—C. A. Fan
*Attorney, Agent, or Firm*—Burgess, Dinklage & Sprung

[57] ABSTRACT

Blood ammonia is quantitatively determined by contacting a sample suspected of containing blood ammonia, with glutamate dehydrogenase, α-ketoglutarate, and, as a coenzyme in the reduced state, nicotinamide-adenine-dinucleotide phosphate in reduced form.

12 Claims, No Drawings

QUANTITATIVE DETERMINATION OF BLOOD AMMONIA

The present invention is concerned with a new process for the quantitative determination of blood ammonia and with a reagent combination for carrying out the process.

The determination of blood ammonia is an important part of laboratory diagnosis, especially in the case of liver diseases. This determination is required most urgently in the case of differential diagnoses of unclear comatose states and the continuous observation of coma associated with liver dysfunction. A number of processes had, therefore, already been developed in order to meet this requirement. Thus, it is known to carry out the ammonia determination by means of the Berthelot reaction with a protein-free blood extract or to determine the ammonia enzymatically in a trichloroacetic acid extract.

These known methods suffer from the disadvantage that they include very considerable possibilities of error which, in particular, are due to the fact that a deproteinization with strong acid is necessary in which a new formation of ammonia can occur, this newly formed ammonia then falsifying the values obtained. Mondzac et al have described a process (see J. Lab. Clin. Med., 66, 526/1965) which is said to be capable of being carried out without deproteinization and which depends upon the reaction of glutamate dehydrogenase and ketoglutarate in the presence of nicotinamide-adenine-dinucleotide (NADH) at pH 7.4. The change of extinction is measured photometrically at 340 m$\mu$. As a result of the slowness of the ammonia reaction and the nonspecific extinction changes which arise, a clear recognition of the end point of the optical test is very difficult and includes considerable sources of error. Therefore, a deproteinization in the case of the enzymatic determination of blood ammonia has hitherto been regarded as being unavoidable (see Manoukian and Fawaz, Z. klin. Chem. u. klin. Biochem., 7, 32/1969).

The present invention provides a quick and certain method for the determination of blood ammonia which can be carried out with the use of non-deproteinized plasma without great trouble and expense. In particular, the present invention provides a process which is suitable for routine laboratory use and can also be carried out on comparatively large numbers of samples.

According to the process of the invention, blood ammonia is quantitatively determined by contacting a sample with glutamate dehydrogenase and $\alpha$-ketoglutarate in the presence of a coenzyme in the reduced state, wherein said reduced coenzyme is nicotinamide-adenine-dinucleotide phosphate in reduced form (NADPH).

The lack of utility of NADH in such application is known and is due to the fact that numerous enzymes and substrates are present in plasma which are also capable of reaction with NADH and, therefore, give rise to side reactions which falsify the results. It was to have been expected that, in the case of NADPH, the same difficulties would arise since this substance is the coenzyme for numerous enzymes present in plasma. Furthermore, according to E. Schmidt (see Methoden der enzymatischen Analyse, ed. H.U. Bergmeyer, Vol. 1, p. 607, 2nd, edn., pub. Verlag Chemie, Weinheim, 1970), glutamate dehydrogenase reacts with NADH much more quickly so that, with regard to the undesired slow reactions which hereby already arise, for this reason alone NADPH would not appear to be useful. Surprisingly, however, we have found that the determination takes place, under suitable reaction conditions, in the presence of NADPH with very great rapidity and, on the other hand, the side reactions of NADPH are so slight that only minimum non-specific extinction changes arise which practically do not have to be taken into account.

Thus, in the case of the known process with the use of NADH, it is necessary to carry out a pre-incubation for 15 to 20 minutes. However, after expiration of the preincubation period, the non-specific side reactions still have not ceased and superimpose the actual determination reactions when, after twenty minutes, the glutamate dehydrogenase is added to the determination batch. In the case of the process according to the present invention, however, a pre-incubation is unnecessary and a stable end value is reached after only five minutes. It is hereby to be noted that, in normal plasma, the ammonia concentration present is so low that a relatively large amount of about 0.5 ml must be used in order to be able to obtain an extinction change in the optical test which is sufficient for an accurate determination. Since no deproteinization or denaturing of the protein takes place, a large amount of enzymes and substrates is, therefore, present in which side reactions with NADPH were to have been expected.

It has proved to be especially advantageous to carry out the process according to the present invention in the presence of adenosine diphosphate (ADP). We have found that a stabilization and activation of the glutamate dehydrogenase can hereby be achieved, which enables the determination to be carried out especially rapidly.

The process according to the present invention is carried out at a neutral to weakly alkaline pH since the activity of the glutamate dehydrogenase hereby exhibits the most favorable values. A particularly preferred range lies between pH 7 and 9.5 and especially between 8.0 and 9.0. It is preferable to operate in a more alkaline range than is conventional in the case of the known processes, especially between pH 8.5 and 8.7 and more especially at pH 8.6. The desired pH can be obtained by the use of an appropriate buffer which is effective in the given pH range, such as phosphate buffer, tris buffer, i.e. tris-(hydroxymethyl)-aminomethane buffer, and triethanolamine buffer.

The concentration of the reaction components can be within the same range as in the case of the known processes. The concentration of the $\alpha$-ketoglutarate in the reaction bath is preferably between about 5 and 20 mM and the glutamate dehydrogenase is preferably added in an amount of between 1 and 20 U/ml of reaction batch. The buffer concentration can also vary within a relatively wiede range but is preferably between about 0.05 and 0.25 M. According to a preferred embodiment of the present invention with the addition of ADP, this latter substance is preferably added in an amount such that a concentration of between about 0.1 and 2 mM is obtained.

The process according to the present invention can, as already mentioned, be carried out in plasma, i.e. in blood which has already been freed from erythrocytes. The process is carried out in such a manner that NADPH and possibly also ADP is added to an $\alpha$-ketoglutarate-containing buffer solution, plasma is then admixed therewith, the initial extinction is measured, the enzyme is added and, after five to ten minutes, the change of the extinction is determined.

The process according to the present invention is not only simple and quick to carry out but it is also characterized by a great degree of exactitude. Thus, experiments were carried out in which 29 plasma samples were mixed with ammonium chloride to give an end concentration of 160.0 $\mu$M. The test results gave ammonia content values which were 100.5% of the actual values.

The present invention also provides a reagent combination for carrying out the process according to the present invention. This reagent combination comprises:

1. $\alpha$-ketoglutarate and optionally ADP dissolved in a buffer of pH 7 to 9.5 and preferably of 8.0 to 9.0;
2. glutamate dehydrogenase; and
3. NADPH, which, prior to use, are not mixed together. However, components 1 and 3 can also be present in mixed form but the storage stability, with cooling, then only amounts to three to four weeks.

A preferred reagent combination according to the present invention comprises the following components:
1. 0.05 to 0.25M triethanolamine buffer, pH 8 to 9
   15 to 50 mM $\alpha$-ketoglutarate
   0.3 to 5mM ADP and optionally
   2 to 30 mM alkali metal azide
2. 5 to 50 U glutamate dehydrogenase
3. 0.1 to 1 $\mu$Mol NADPH, preferably in the presence of a stabilizer or stabilizer mixture.

A suitable stabilizer for NADPH according to the present invention consists of serum albumin alone or in admixture with sodium bicarbonate and dextran. Therefore, component 3 of the above preferred combination preferably comprises 0.1 to 0.5 $\mu$Mol NADPH, 10 to 50 mg serum albumen, 1 to 5 $\mu$Mol sodium bicarbonate and 5 to 60 mg, preferably 5 to 50 mg, dextran.

The above-described reagent combination according to the present invention is, in the given amounts, sufficient for a single determination. However, it can also be in the form of a plurality of such amounts for carrying out a larger number of determinations.

The process according to the present invention can be used not only for the direct determination of ammonia in blood or plasma but also for the determination of other ammonia-forming substances, for example urea. In the latter case, to the reaction batch or to the reagent there is merely also only added urease or a mixture of glutamate dehydrogenase and urease can be used.

The following Examples are given for the purpose of illustrating the present invention:

EXAMPLE 1

A reaction mixture is used which contains the following components:
0.15 M triethanolamine hydrochloride, pH 8.6
20 mM $\alpha$-ketoglutarate
1.5 mM ADP
15 mM sodium azide
0.3 mM NADPH Into two cuvettes with a thickness of 10 mm, there are measured in the following:

|  | test batch | reagent blank batch |
| --- | --- | --- |
| reaction mixture, ml | 1.5 | 1.5 |
| plasma, ml | 0.5 | — |
| water, ml | — | 0.5 |

The batches are mixed and the initial extinction $E_1$ is measured at 334 nm. 20 $\mu$l glutamate dehydrogenase are then added to each of the two batches. The decrease of the extinction is followed until it comes to a stop (about 5 minutes), whereafter the extinction $E_2$ is measured.

From the sample batch and the reagent blank batch, there is calculated the extinction difference $\Delta E = E_1 - E_2$. The corrected extinction difference:

$\Delta E_{correct} = \Delta E_{sample\ batch} - \Delta E_{reagent\ blank}$ is introduced into the calculation:

$$\mu\text{mol NH}_3/l = \Delta E_{corr.} \times \frac{4.04 \times 1000}{6.0} = \Delta E_{corr.} \times 673$$

($\epsilon_{334}$ of NADPH = 6.0 cm$^2$/$\mu$Mol, dilution of the sample in the determination batch 4.04 fold; recalculation of 1).

EXAMPLE 2

Reagent combination for one determination
1. A container with buffer/substrate mixture in stabilized aqueous solution, containing:
   0.15M triethanolamine hydrochloride, pH 8.6
   20 mM $\alpha$-ketoglutarate
   1.5 mM ADP
   15 mM sodium azide
2. A container with 0.3 $\mu$Mol NADPH dried or lyophilized therein
   5 $\mu$Mol sodium bicarbonate
   30 mg albumen
3. 900 U/ml glutamate dehydrogenase, dissolved in glycerol/water (1:1), containing:
   5 mM phosphate buffer, pH 7 and
   1 mM ADP.

It will be understood that the specification and examples are illustrative but not limitative of the present invention and that other embodiments within the spirit and scope of the invention will suggest themselves to those skilled in the art.

What is claimed is:
1. Process for the quantitative determination of blood ammonia which comprises contacting a sample suspected of containing blood ammonia with glutamate dehydrogenase, $\alpha$-ketoglutarate, and, as a coenzyme in the reduced state, nicotinamideadenine-dinucleotide phosphate in reduced form.
2. Process as claimed in claim 1, wherein the determination is carried out in the additional presence of adenosine diphosphate.
3. Process as claimed in claim 1, wherein the determination is carried out in a buffer of pH 7.0 to 9.5.
4. Process as claimed in claim 3, wherein the determination is carried out in a buffer of pH 8.0 to 9.0.
5. Process as claimed in claim 4, wherein the determination is carried out in a buffer of pH 8.5 to 8.7.
6. Process as claimed in claim 5, wherein the determination is carried out in a buffer of pH 8.6.
7. Process as claimed in claim 3, wherein the buffer used is one of tris buffer, triethanolamine buffer and phosphate buffer.

8. Reagent combination for carrying out the process as claimed in claim 1, comprising:
 1. α-ketoglutarate dissolved in a buffer of pH 7 to 9.5;
 2. glutamate dehydrogenase; and
 3. NADPH.

9. Reagent combination as claimed in claim 8, containing ADP dissolved in said buffer.

10. Reagent combination as claimed in claim 8, comprising:
 1. 0.05 to 0.25 M triethanolamine buffer, pH 8 to 9
  15 to 50 mM α-ketoglutarate
  0.3 to 5 mM ADP
 2. 5 to 50 U glutamate dehydrogenase
 3. 0.1 to 0.5 μMol NADPH or a multiple thereof.

11. Reagent combination according to claim 9, wherein the third component comprises:
 0.1 to 0.5 μMol NADPH
 10 to 50 mg serum albumen
 1 to 5 μMol sodium bicarbonate
 5 to 60 mg dextran or a multiple thereof.

12. Reagent combination as claimed in claim 10 also containing 2 to 30 mM alkali metal azide.

* * * * *